ized" bed reactor may be utilized in carrying out the process of this invention.

United States Patent Office 3,106,574
Patented Oct. 8, 1963

3,106,574
METHOD FOR THE MANUFACTURE OF ACETONITRILE
James L. Callahan, Bedford, and John A. Stamm, Mayfield Heights, Ohio, assignors to The Standard Oil Company, Cleveland, Ohio, a corporation of Ohio
No Drawing. Filed Dec. 19, 1960, Ser. No. 76,508
6 Claims. (Cl. 260—465.1)

The present invention relates to the manufacture of acetonitrile. More particularly, the process of this invention relates to the conversion of an acyclic organic compound containing two to three carbon atoms selected from the group consisting of alcohols, aldehydes, ketones and acids to acetonitrile.

In brief, the process of this invention comprises the step of contacting a gaseous mixture comprising an acyclic organic compound containing two to three carbon atoms, ammonia and oxygen with a catalyst and at an elevated temperature. In some cases, it may be beneficial to add a small amount of water to the reaction mixture, but reaction mixtures not including water are not to be excluded from the scope of this invention inasmuch as such mixtures also give good results.

As mentioned above, one of the reactants is an acyclic organic compound containing two to three carbon atoms selected from the group consisting of aldehydes, ketones, alcohols and acids. For example, ethanol, isopropanol, normal propanol, acetaldehyde, acetone and acetic acid are converted to acetonitrile in good yields. Mixtures of these compounds may also be employed in the process. Ethanol is converted to acetonitrile at high conversion levels and for this reason, it is the preferred starting material.

Any source of ammonia may be used in the process and a high degree of purity is not required for the ammonia. Small amounts of materials such as nitrogen are not harmful and behave merely as diluents in the process. Likewise, any source of molecular oxygen may be employed in this process, and one convenient source of oxygen is air.

The molar ratio of the ammonia to the acyclic organic starting material should be in the range of about 0.5:1 to 2:1, and a ratio of about 1:1 is preferred. Along the same line, the ratio of oxygen to the organic starting material should be in the range of 0.5:1 to about 5:1, and once again, ratios of about 1:1 are preferred. In those cases where water is added to the reaction mixture, the ratio of water to the organic starting material should not exceed 10:1 and ratios of about 4:1 are preferred.

The catalyst employed in the process of this invention is bismuth phosphomolybdate. The bismuth phosphomolybdate may be employed by itself or in conjunction with a support material and in those cases where a support is present, the final composition should comprise at least 5% of the bismuth phosphomolybdate. There is nothing critical about the support and suitable supports are silica, alumina, silica-alumina, alundum, silicon carbide and the like. The method of preparation of the catalyst is not critical and any of the many conventional methods of catalyst preparation known to those skilled in the art may be employed. One important feature of the catalyst is the surface area which must be fairly carefully controlled. In general, the surface area of the catalyst should lie in the range from about 10 to about 100 square meters per gram. The surface area may be modified, if necessary, to meet this limitation by heat treatment, as will be readily apparent to those skilled in the art.

In actual operation of the process the catalyst may be employed in any convenient form, e.g. small particles, pellets, etc. The process may be carried out in either batch or continuous fashion and either a fixed bed reactor or a so-called "fluidized" bed reactor may be utilized in carrying out the process of this invention.

The process is carried out under relatively mild operating conditions. Hence, any temperature within the range of 500 to 1000° F. may be employed, although temperatures in the middle of this range are preferred, on the order of 750 to 850° F. In the same vein, the reaction may be conveniently conducted at atmospheric pressure. Higher pressures are also operable but the pressure should not exceed about 8 atmospheres. Contact time may vary from about 0.1 second to about 100 seconds, but the preferred range for the contact time is 1 to 20 seconds.

The invention will be better understood by reference to the following specific examples. In all of these examples the same equipment was employed, i.e., the reactor was a vertical stainless steel pipe having an I.D. of 1.682 inches and 300 cc. of catalyst were employed in all runs in order to eliminate the amount of catalyst as a variable. All of the runs were conducted at a temperature of about 800° F. and at atmospheric pressure. The contact time was approximately three seconds.

*Example I*

A catalyst comprising bismuth phosphomolybdate and silica was prepared in the following manner. At the outset 500 lbs. of a silica sol containing 30% by weight of silica was mixed with 1214 ml. of 85% phosphoric acid. In a separate vessel, 83.3 lbs. of ammonium heptamolybdate [$(NH_4)_6Mo_7O_{24} \cdot 4H_2O$] were dissolved in 42.7 liters of water. The molybdate solution was then added to the acidified silica solution and thoroughly mixed. Next, 171 lbs. of bismuth nitrate [$Bi(NO_3)_3 \cdot 5H_2O$] was dissolved in 42.7 liters of a 5% nitric acid solution. The bismuth solution was then added to the previously prepared solution and after mixing, the resulting solution was spray-dried. The spray-dried product was mixed with 5 wt. percent graphite and pelleted which resulted in the formation of pellets 1/4" by 3/16". The pellets were then calcined at 800° F.

This catalyst was utilized in a run employing ethanol as the starting material. The feed to the reactor had the following composition.

| Ingredient: | Mol percent |
|---|---|
| Ethanol | 9 |
| Air | 73 |
| Ammonia | 9 |
| Water | 9 |

Analysis of the products obtained in this run indicated that 69.7% of the ethanol introduced to the reactor was converted to acetonitrile.

*Example II*

In another run employing acetaldehyde as the starting material, the catalyst of Example I was employed. The feed had the following composition.

| Ingredient: | Mol percent |
|---|---|
| Acetaldehyde | 9 |
| Air | 73 |
| Ammonia | 9 |
| Water | 9 |

Analysis of the products obtained in this run showed that 54.2% of the acetaldehyde fed to the reactor had been converted to acetonitrile.

*Example III*

In another run employing acetone as the starting material, the catalyst of Example I was again employed. The feed had the following composition.

| Ingredient: | Mol percent |
|---|---|
| Acetone | 9 |
| Air | 73 |
| Ammonia | 9 |
| Water | 9 |

Analysis of the products showed that 29.3% of the acetone introduced to the reactor was converted to acetonitrile.

*Example IV*

In another run employing isopropanol as the starting material, the catalyst of Example I was also employed. The feed had the following composition.

| Ingredient: | Mol percent |
|---|---|
| Isopropanol | 9 |
| Air | 73 |
| Ammonia | 9 |
| Water | 9 |

Analysis of the products of this reaction showed that 25.8% of the isopropanol fed to the reactor was converted to acetonitrile.

*Example V*

In still another run normal propanol was employed as the starting material and the catalyst of Example I was employed. The feed had the following composition.

| Ingredient: | Mol percent |
|---|---|
| Normal propanol | 9 |
| Air | 73 |
| Ammonia | 9 |
| Water | 9 |

Analysis of the products of this reaction revealed that 21.2% of the normal propanol fed to the reactor was converted to acetonitrile.

*Example VI*

In still another run acetic acid was employed as the starting material. Once again the catalyst of Example I was employed. The feed had the following composition.

| Ingredient: | Mol percent |
|---|---|
| Acetic acid | 9 |
| Air | 73 |
| Ammonia | 9 |
| Water | 9 |

Analysis of the products of this reaction showed that 20.8% of the acetic acid introduced to the reactor was converted to acetonitrile.

It will be obvious from the foregoing examples that the process of this invention provides a rapid and economical method for the manufacture of acetonitrile. The method is particularly useful because the by-products which characterize other processes such as acrylonitrile are produced only in trace quantities in the process of this invention.

It will be obvious to those skilled in the art that many modifications of the invention may be made without departing from the spirit or scope of this application, and this application for Letters Patent is intended to cover all such modifications as would reasonably fall within the scope of the appended claims.

We claim:

1. A process for the manufacture of acetonitrile comprising the step of contacting a gaseous mixture of an acyclic organic compound selected from the group consisting of ethanol, normal propanol, isopropanol, acetaldehyde, acetone and acetic acid with a catalyst consisting essentially of bismuth phosphomolybdate having a surface area within the range of from about 10 to about 100 square meters per gram, said gaseous mixture containing a molar ratio of ammonia to acyclic organic compound in the range of about 0.5:1 to 2:1 and a molar ratio of oxygen to acyclic organic compound in the range of about 0.5:1 to 5:1, said contacting being conducted for a time within the range of about 0.1 second to about 100 seconds, at a pressure within the range of one to about eight atmospheres and at a temperature in the range of 500 to 1000° F.

2. The process for the manufacture of acetonitrile described in claim 1 wherein the acyclic organic compound is ethanol.

3. The process for the manufacture of acetonitrile described in claim 1 wherein the acyclic organic compound is acetaldehyde.

4. The process for the manufacture of acetonitrile described in claim 1 wherein the acyclic organic compound is acetone.

5. The process for the manufacture of acetonitrile described in claim 1 wherein the acyclic organic compound is isopropanol.

6. The process for the manufacture of acetonitrile described in claim 1 wherein the acyclic organic compound is normal propanol.

References Cited in the file of this patent

UNITED STATES PATENTS

| 2,337,422 | Spence et al. | Dec. 21, 1943 |
| 2,653,964 | Hagemeyer | Sept. 29, 1953 |
| 2,691,037 | Bellringer et al. | Oct. 5, 1954 |
| 2,904,580 | Idol | Sept. 15, 1959 |
| 2,941,007 | Callahan et al. | June 14, 1960 |